US010173324B2

(12) United States Patent
Wang et al.

(10) Patent No.: US 10,173,324 B2
(45) Date of Patent: Jan. 8, 2019

(54) FACILITATING ROBOT POSITIONING (71) Applicant: ABB SCHWEIZ AG, Baden (CH)

(72) Inventors: Jianjun Wang, West Hartford, CT (US); Biao Zhang, West Hartford, CT (US); Carlos Martinez, South Windsor, CT (US); Carlos Winsor Morato, Avon, CT (US); Remus Boca, Simsbury, CT (US)

(73) Assignee: ABB Schweiz AG, Baden (CH)

( * ) Notice: Subject to any disclaimer, the term of this patent is extended or adjusted under 35 U.S.C. 154(b) by 57 days.

(21) Appl. No.: 14/941,823

(22) Filed: Nov. 16, 2015

(65) Prior Publication Data
US 2017/0136626 A1 May 18, 2017

(51) Int. Cl.
*G06K 9/00* (2006.01)
*B25J 9/16* (2006.01)
*G06T 7/73* (2017.01)

(52) U.S. Cl.
CPC ........... *B25J 9/1697* (2013.01); *B25J 9/1692* (2013.01); *G06T 7/74* (2017.01); *G06T 2200/04* (2013.01); *G06T 2207/10028* (2013.01); *G06T 2207/30244* (2013.01); *Y10S 901/09* (2013.01)

(58) Field of Classification Search
CPC ... B25J 9/1692; B25J 9/1697; G06T 7/20344; Y10S 901/09
USPC ........................................................ 382/153
See application file for complete search history.

(56) References Cited

U.S. PATENT DOCUMENTS

| 6,044,308 | A   | * | 3/2000  | Huissoon | B25J 9/1692 |
|-----------|-----|---|---------|----------|-------------|
|           |     |   |         |          | 700/166     |
| 7,818,091 | B2  | * | 10/2010 | Kazi     | B25J 9/1697 |
|           |     |   |         |          | 318/568.1   |
| 8,406,923 | B2  | * | 3/2013  | Ueyama   | B25J 9/1697 |
|           |     |   |         |          | 700/245     |
| 8,437,535 | B2  | * | 5/2013  | Boca     | G01B 11/25  |
|           |     |   |         |          | 382/154     |
| 9,124,873 | B2  | * | 9/2015  | Liu      | H04N 13/0203|
| 9,199,378 | B2  | * | 12/2015 | Groll    | B25J 9/1676 |

(Continued)

OTHER PUBLICATIONS

International Searching Authority International Search Report and Written Opinion, PCT Application No. PCT/US16/62059, dated Jan. 31, 2017, 13 pages.

(Continued)

*Primary Examiner* — Iman K Kholdebarin
(74) *Attorney, Agent, or Firm* — J. Bruce Schelkopf; Taft Stettinius & Hollister LLP (57) ABSTRACT

Robot positioning is facilitated by obtaining, for each time of a first sampling schedule, a respective indication of a pose of a camera system of a robot relative to a reference coordinate frame, the respective indication of the pose of the camera system being based on a comparison of multiple three-dimensional images of a scene of an environment, the obtaining providing a plurality of indications of poses of the camera system; obtaining, for each time of a second sampling schedule, a respective indication of a pose of the robot, the obtaining providing a plurality of indications of poses of the robot; and determining, using the plurality of indications of poses of the camera system and the plurality of indications of poses of the robot, an indication of the reference coordinate frame and an indication of a reference point of the camera system relative to pose of the robot.

21 Claims, 5 Drawing Sheets

(56) References Cited

U.S. PATENT DOCUMENTS

| | | | | |
|---|---|---|---|---|
| 9,457,470 B2* | 10/2016 | Lundberg | ............... | B25J 9/1692 |
| 2014/0002597 A1* | 1/2014 | Taguchi | ............... | H04N 13/275 |
| | | | | 348/43 |
| 2014/0156073 A1* | 6/2014 | Zhang | ................... | B25J 9/1689 |
| | | | | 700/257 |
| 2015/0120057 A1* | 4/2015 | Wong | ..................... | G05D 1/024 |
| | | | | 700/259 |
| 2015/0201180 A1 | 7/2015 | Mourikis et al. | | |

OTHER PUBLICATIONS

Bonchis, Adrian et al., "Robotic Explosive Charging in Mining and Construction Applications", IEEE Transactions on Automation Science and Engineering, Jan. 2014, pp. 245-250, vol. 11.

* cited by examiner

FACILITATING ROBOT POSITIONING

BACKGROUND

Current robotic scanning and positioning systems use either measured robot positions or image registration methods to estimate the relative camera view positions in order to register (commonly called "stitch") individual camera views. There are advantages and disadvantages to each approach, but some problems are common to both. For example, both methods require calibration of the camera-to-robot relation and have an accuracy problem due to the use of robot nominal kinematics.

SUMMARY

Shortcomings of the prior art are overcome and additional advantages are provided through the provision of a method that includes obtaining, for each time of a plurality of times of a first sampling schedule, a respective indication of a pose of a camera system of a robot relative to a reference coordinate frame, the respective indication of the pose of the camera system being based on a comparison of multiple three-dimensional images of a scene of an environment, the obtaining providing a plurality of indications of poses of the camera system; obtaining, for each time of a plurality of times of a second sampling schedule, a respective indication of a pose of the robot, the obtaining providing a plurality of indications of poses of the robot; and determining, using the plurality of indications of poses of the camera system and the plurality of indications of poses of the robot, an indication of the reference coordinate frame and an indication of a reference point of the camera system relative to pose of the robot.

Further, a computer system configured to perform a method is disclosed, the method including obtaining, for each time of a plurality of times of a first sampling schedule, a respective indication of a pose of a camera system of a robot relative to a reference coordinate frame, the respective indication of the pose of the camera system being based on a comparison of multiple three-dimensional images of a scene of an environment, the obtaining providing a plurality of indications of poses of the camera system; obtaining, for each time of a plurality of times of a second sampling schedule, a respective indication of a pose of the robot, the obtaining providing a plurality of indications of poses of the robot; and determining, using the plurality of indications of poses of the camera system and the plurality of indications of poses of the robot, an indication of the reference coordinate frame and an indication of a reference point of the camera system relative to pose of the robot.

Yet further, a computer program product including a computer readable storage medium readable by a processor and storing instructions for execution by the processor is provided for performing a method that includes: obtaining, for each time of a plurality of times of a first sampling schedule, a respective indication of a pose of a camera system of a robot relative to a reference coordinate frame, the respective indication of the pose of the camera system being based on a comparison of multiple three-dimensional images of a scene of an environment, the obtaining providing a plurality of indications of poses of the camera system; obtaining, for each time of a plurality of times of a second sampling schedule, a respective indication of a pose of the robot, the obtaining providing a plurality of indications of poses of the robot; and determining, using the plurality of indications of poses of the camera system and the plurality of indications of poses of the robot, an indication of the reference coordinate frame and an indication of a reference point of the camera system relative to pose of the robot.

Additional features and advantages are realized through the concepts described herein.

BRIEF DESCRIPTION OF THE DRAWINGS

Aspects of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

DETAILED DESCRIPTION

Aspects described herein relate generally to robotic three-dimensional scanning and robot positioning, for instance as used with industrial robotic systems that use a robot-mounted three-dimensional camera to scan a scene in an environment and then position the robot to/at features in the scanned scene to perform intended operations. More specifically, approaches for facilitating accurate robot positioning are disclosed. As an example, a sensor fusion approach is provided that combines robot position measurement ('robot odometry') with image registration method(s) ('visual odometry'), which can be used to automate camera-to-robot calibration and increase robot positioning accuracy. This is especially helpful for robotic applications in areas where the positions of objects or feature characteristics are unknown.

Figure 1:
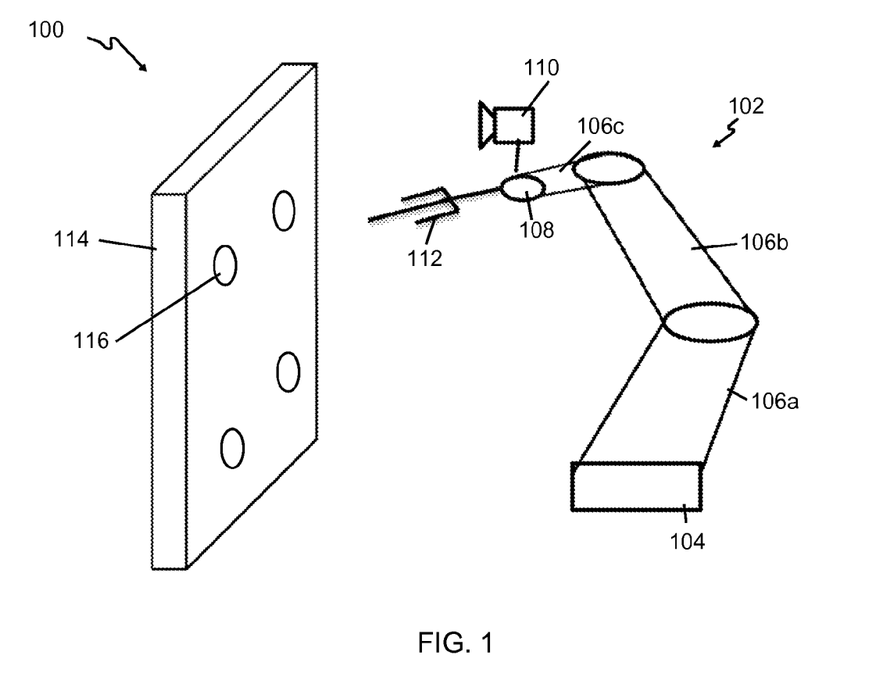
FIG. 1 depicts an example environment in which a robot performs work on a wall of unknown features.

One such application is depicted by way of example and not limitation in FIG. 1, which specifically depicts an example environment in which a robot performs work on a wall of unknown features. In environment 100, robot 102 includes a robot base 104 coupled to a robot mounting flange 108 via robot arms 106a, 106b, and 106c. Robot mounting flange 108 has tools mounted thereto, namely camera 110 and gripper 112. Robot 102 is adjacent wall 114. Robot 102 works on features of wall 114. In this example, wall 114 is a wall of rock, the features are holes 116 in the rock, and the task of the robot is to fill each hole 116 with explosive materials. One application of this work is in mining operations where the work environment is extremely dangerous because of structural risks, poor lighting conditions, and other reasons.

The emergence of low cost and fast three-dimensional (3D) cameras, such as the Kinect® line of products offered by Microsoft Corporation, Redmond, Wash., USA (of which KINECT is a trademark), has made it possible to scan an unknown scene in real time with reasonable accuracy. The scanned model of the scene, typically represented in the form of a point cloud or a mesh model, can be readily imported into a computer-aided design (CAD) environment or other type of computer program for further processing. For industrial applications, the processing can be the identification and localization of features of interest so that the robot can move to the features to perform special operations. Additionally or alternatively, the processing can be generation of motion paths along which the robot can perform operations, such as painting or gluing.

Three-dimensional scanning refers to the stitching of multiple camera views (images) to cover an entire scene. Stitching uses the measurement of relative camera position between the views, which can be provided by motion sensors such as GPS and encoders, or by the visual data itself.

Aspects described herein overcome problems in current approaches for robotic scanning and positioning. Current setups use either measured robot positions ('robot odometry'), or image registration method(s) ('visual odometry') to estimate the relative camera view positions in order to register/stitch individual camera views. Odometry refers to the tracking of position relative to a known location, usually the starting position. Example robot odometry might be determined based on received data from encoders that indicate some movement in the robot or component thereof. Example visual odometry is image registration, in which sequential camera images are analyzed to track position and distances.

Both approaches rely on calibration of camera-to-robot relation, and each have an accuracy problem due to the use of robot nominal kinematics. On the other hand, each odometry has its own advantages and disadvantages.

Scanning systems use an odometer to estimate the relative view positions in order to, e.g., stitch individual camera views together. Traditionally, visual Simultaneous Localization And Mapping (SLAM)-based 3D scanning systems rely on only the acquired visual data (visual odometry) to build the model using advanced registration methods. Kinect Fusion, developed by Microsoft Corporation, is one such example of visual SLAM. Visual odometry uses advanced computer algorithms, such as ICP (Iterative Closest Point) or SURF (SpeedUp Robust Features), in conjunction with RANSAC (RANdom Sampling And Consensus) to align the overlapped features on the camera views in order to determine the relative camera position. Visual odometry can work very well in registering feature-rich views. However, visual odometry has accuracy problems when scanning feature-less or feature-sparse scenes. In addition, because it is based on relative measurement, it suffers distance drift if the scanning path does not return to previous visited location(s). Distance drift refers to error accumulation in relatively long-range scanning.

For a scanning system that includes a robot-mounted 3D camera, the robot itself is a position sensor and can serve as the odometer for the scanning In this setup, the camera tool center point (TCP) is accurately calibrated to obtain the correct camera position in robot space. Low-cost 3D cameras tend to be very noisy. Consequently, achieving accurate camera TCP calibration can be challenging. For real time fast scanning applications, it is helpful if time-synchronization between the camera image acquisition and the robot position reading is ensured with high-accuracy. However, real time synchronization between the robot position reading and the camera image acquisition is not straightforward and necessitates tuning. This is not a trivial task if there is no built-in time-synchronization facility for the camera and for the robot controller. Even if the time is perfectly synchronized and the camera TCP is accurately known, stitching of a large scene could be still be challenging because the robot is not accurate in 3D space with the nominal kinematic calculation. As a result, features on the scanned model may be distorted and become harder to detect.

Thus, while robotic scanning and positing systems based on either robot odometry or visual odometry have their own advantages and disadvantages in comparison to each other, they suffer from common problems.

Aspects described herein can automate the calibration step and increase robot positioning accuracy when moving to a feature on a scanned three-dimensional model. Both the robot based odometry and the visual odometry are leveraged to automate the robot-to-camera calibration. As explained in detail below, the camera position coordinates from the image registration and the robot position coordinates from the robot controller, together with their timestamps, are recorded at a fast sampling rate and stored during the scanning process. The scene may be stitched primarily with image registration method(s), but robot based odometry can be used when a feature-less region is encountered. In this regard, and as an example, the image registration method can output an index showing how well the registration method works, the index telling whether the scene is feature-rich or feature-poor. The feature position on the 3D scanned model can be detected in the scene space. When the robot is required to move to that feature, the feature coordinates in the scene space can be converted to the robot space based on the recorded, dense pairs of the camera position coordinates and robot position coordinates. This can be done by estimating the camera TCP and the work object of the scene.

In addition, the time delay between the camera acquisition and the robot position reading can be also estimated using the recorded time stamp information. Another possibility for improved accuracy is to estimate and use different camera TCPs and scene work objects across different scan regions.

By way of specific example, and referring to FIG. 1, the task is to find the positions of the holes 116 in wall 114, then to drive the robot 102 to each hole 116 so that the robot mounted gripper 112 can be inserted into the hole 116. A 3D camera 110 is mounted on the robot mounting flange 108 as is the gripper tool 112. There are respective coordinate frames associated with each of the robot base 104, the robot mounting flange 108, the gripper 112, the camera 110, and the wall 114.

"Pose" of an object refers to the position and orientation relative to some coordinate system. Pose can have many different but equivalent mathematical representations. For example, a six-component vector [x, y, z, roll, pitch, yaw] can represent translation in x, y, z and orientation in roll, pitch, yaw. In the examples described herein, a 4-by-4 (4×4) matrix is used only by way of specific example for simplicity, though any appropriate representation of pose is appropriate.

Typically the pose of a robot is expressed as the pose of its mounting flange ($T_0$), and can be calculated from its joint measurement θ as:

$$T_0 = K(\theta, \mathcal{M}) \tag{1},$$

where $\mathcal{M}$ is the robot kinematic model parameters, including the arm (106) link lengths, the initial joint positions, and other factors.

If nominal values of $\mathcal{M}$ are used, equation (1) provides the "nominal kinematics". Otherwise, equation (1) provides absolute accurate kinematics if the values of the factors are accurately measured or identified. Nominal kinematics has lower accuracy in determining the pose of a robot. In examples, the joint measurement θ and the robot position $T_0$ can be read directly from the robot controller at a very fast sampling rate, for example every 4 ms or so depending on system capabilities.

Once the pose of the robot $T_0$ (e.g. as indicated by pose of the mounting flange) is known, the poses of the camera and the gripper can be determined by using their TCP values as:

$$T_c = T_0 * TCP_c$$

$$T_g = T_0 * TCP_g \qquad (2),$$

where $T_c$ and $T_g$ are the poses of the camera 110 and the gripper 112, respectively, relative to the robot base 104. The so-called TCP, or tool center point, defines the relative pose of an object relative to the robot mounting flange. Here, the tool center point of the camera, i.e., the reference point of the camera system relative to the robot mounting flange, is represented by $TCP_c$, and the tool center point of the gripper, i.e. the reference point of the gripper relative to the robot mounting flange, is represented by $TCP_g$.

To be able to obtain a tool pose, first the TCP of the tool is calibrated. For a mechanical tool, such as a gripper, its TCP can be calibrated using a commonly known four-point method where the tool tip is moved to touch a fixed point from four different angles. For a camera, the camera frame is defined as the reference frame for its acquired image and is typically invisible. Commonly used methods for calibration are manual calibration or automated 'hand-eye' calibration.

Position of any feature in the image space can therefore be converted to the robot space by using:

$$H_r = T_c * H_c = T_0 * TCP_c * H_c \qquad (3),$$

where $H_c$ is the feature pose in camera space (relative to the camera frame), and $H_r$ is the feature pose in robot space (relative to the robot base). Eq. (3) above is the basis for manual calibration, where a feature pattern with known position in robot space is placed in the view of the camera and the features in the image space are detected.

Once a feature pose in robot space is known, a robot position $T_0'$ for a tool (e.g. a gripper) to reach that feature can be found by using Eq. (2):

$$T_0' * TCP_g = H_r \qquad (4).$$

Scanning using a 3D camera takes multiple images and merges them into a scene. This scene has a reference coordinate frame, W, whose pose relative to the robot base frame is called the 'work object' of the scene. It is often defined as the pose of the camera frame at the first shot in relation to the robot base frame. Stitching of the shots relies on the relative camera poses of those shots. Image registration can produce these relative poses using advanced vison algorithms, while, in contrast, robot based odometry (measured robot positions) provides them by using equation (2). Let the pose of the camera system $T_v(t)$ be the relative camera pose generated by the visual odometry at time instant tin reference to W (e.g. the $1^{st}$ camera pose). In this manner, the pose of the camera system relative to reference coordinate frame W is determined based on a comparison of multiple three-dimensional images of a scene of the environment. It is noted that the pose can be determined absent prior knowledge of the characteristics of the features of the scene, such as the distances between these features, and therefore differs from situations where a test configuration or calibration pattern of known characteristics is the item being scanned.

The relation between the image registration and measured robot position can be written as:

$$T_c(t) = W * T_v(t) = T_0(t) * TCP_c \qquad (5).$$

Figure 2:
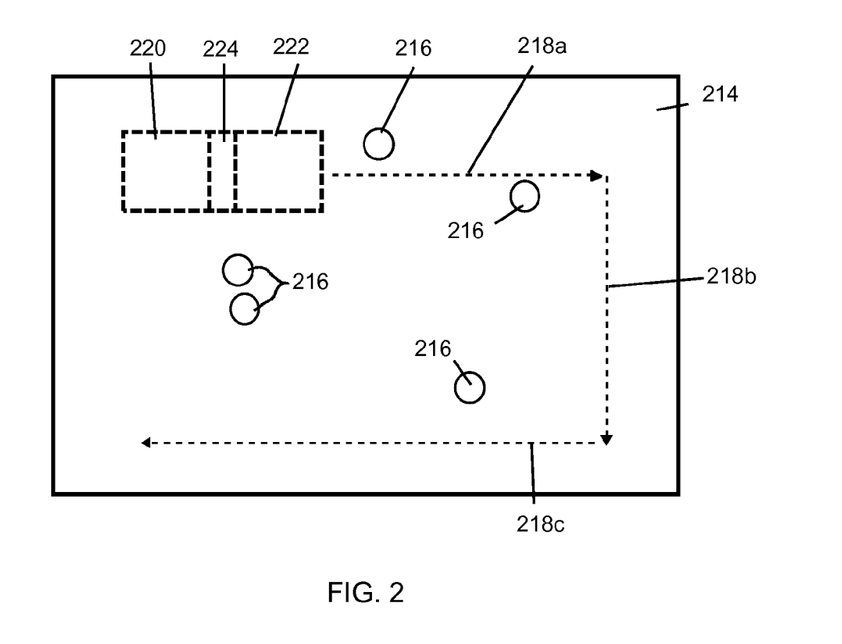
FIG. 2 depicts an example segmented scanning path across multiple scan regions in accordance with aspects described herein.

FIG. 2 depicts an example segmented scanning path across multiple scan regions, in accordance with aspects described herein. The scanning path of the camera is sectioned into segments 218a, 218b, 218c and is the trajectory of the camera frame's origin in relation to the wall. As the camera moves, it obtains three-dimensional images of the wall at a frame rate, the images being images of the features 216. These 3D images will overlap as illustrated. Image 220 obtained at time $t_1$ overlaps image 222 obtained at time $t_2$ to define an overlapping region 224. The scanning path in this example is composed of three segments 218a, 218b, 218c. For improved accuracy, a respective camera TCP and wall work object W is determined for each segment in accordance with aspects described herein.

If the image acquisition and the robot position readings are synchronized with the same sampling rate $t_s$, then when the robot moves, a series of $T_v(k*t_s)$ and $T_0(k*t_s)$ are obtained, where k=1 . . . n. Eq. (5) then becomes a set of equations:

$$W * T_v(k) = T_0(k) * TCP_c, \; k=1 \ldots n \qquad (6),$$

and as noted earlier, each of the above terms may be represented as 4×4 matrices, and the '*' operator refers to multiplication. $T_v(k)$ is short hand for $T_v(k*t_s)$, while $T_0(k)$ is for $T_0(k*t_s)$.

Eq. (6) above produces n equations (k=1, . . . , n). These n equations can be effectively solved, e.g. using a least squares algorithm, to determine W and $TCP_c$. Once W is known, the position of a feature (e.g. a hole) in the robot space, relative to the robot base frame, can be found by:

$$H_r = W * H_w \qquad (7),$$

where $H_w$ is the feature position in scene space (relative to the scene frame W), usually obtained by using advanced vision algorithms.

Once again, with a known feature positon in the robot space, Eq. (4) can be used to determine a robot position—a $T'_0$—suitable for utilizing the tool against the feature (e.g. to insert gripper 112 into hole 116).

In practical situations, image acquisition and robot position readings are likely running on different computational devices and using different sampling rates. Consequently, it is unlikely that the timing of their acquisitions will be synchronized (i.e. that a $T_v$ and $T_0$ will be determined for a common time t). Thus, denote $t_k^v$ the time instant of $T_v$ and $t_k^r$ the time instant of $T_0$. From the scanning, we obtain time-stamped data corresponding to different sampling schedules:

$$T_v(t_1^v), T_v(t_2^v), T_v(t_3^v), \ldots, T_v(t_n^v) \text{ and}$$

$$T_0(t_1^0), T_0(t_2^0), T_0(t_3^0), \ldots, T_0(t_m^0) \qquad \text{Eq. (8)}.$$

Assume the delay between image acquisition and the robot reading is known as d. Then:

$$t_1^v = t_1^0 - d \qquad \text{Eq. (9)}.$$

Typically, the robot position can be read much faster than the image acquisition. This creates much denser data points for the robot positions than for the visual odometry (m>>n). For each $T_v(t_k^v)$, we can interpolate a $T_0$ at the time $t_k^v + d$. By Eq. (5) above, we now have n equations to solve for W and $TCP_c$ (using a least squares approach again, for instance):

$$W * T_v(t_k^v) = \tilde{T}_0(t_k^v + d) * TCP_c, \; k=1 \ldots n \qquad (10),$$

where ~ denotes that the value is interpolated.

If the time delay d is not known, it can be calibrated first before least squares fitting is performed on Eqs. (10). One way to calibrate this time delay is to implement the IEEE-1588 Standard for Precision Clock Synchronization Protocol for Networked Measurement and Control Systems.

Alternatively, d can be solved simultaneously with W and $TCP_c$. A nonlinear optimization algorithm, such as one provided by Matlab® (developed by MathWorks, Natick, Mass., USA, of which MATLAB is a trademark), may be applied for such purpose.

To improve the accuracy, in some embodiments multiple TCPs and Ws can be determined and used for the camera during different scene regions. Eqs. (10) therefore may be solved for different scan regions. For example, as shown in FIG. 2, the scene is split into three regions, each defined by a respective segment of 218a, 218b, 218c. The following equations can be built for each scan region:

$$\text{Region 1: } W^1 * T_v(t_k^v) = \tilde{T}_0(t_k^v + d) * TCP_c^1, k=1 \ldots p \quad (11\text{-}1)$$

$$\text{Region 2: } W^2 * T_v(t_k^v) = \tilde{T}_0(t_k^v + d) * TCP_c^2, k=p+1 \ldots q \quad (11\text{-}2)$$

$$\text{Region 3: } W^3 * T_v(t_k^v) = \tilde{T}_0(t_k^v + d) * TCP_c^3, k=q+1 \ldots n \quad (11\text{-}3).$$

Additionally or alternatively, accuracy may be further improved by adding $\mathcal{M}$ as another set of unknowns in Eq. (10) by plugging Eq. (1) into Eq. (10), $$W * T_v(t_k^v) = K(\tilde{\theta}(t_k^v + d), \mathcal{M}) * TCP_c, k=1 \ldots n \quad (12)$$

In Eq. (12), the joint measurement is used in place of robot flange position. This equation now has four sets of unknown parameters (W, $TCP_c$, d, $\mathcal{M}$), which can be solved using nonlinear optimization algorithm(s), for example.

From aspects described herein, combining the image registration method(s) and robot position can eliminate the need to perform a separate and discrete calibration step for the camera TCP and scene work object. Camera TCP and scene work object are automatically obtained as a by-product of the scanning process, provided that the scanned scene has enough features to provide for adequate image registration.

Additionally or alternatively, aspects described herein may be used with featureless scenes (or those lacking sufficient features for image registration to be effective). In this scenario, aspects described herein can be used as a calibration step to calibrate the camera TCP, in which a feature-rich scene can be provided as a separate artificial scene for purposes of the calibration, or the original featureless scene is altered with the purposeful addition of features.

Yet further, aspects described herein can be used for scenes that have a mix of feature-rich regions and feature-poor regions. Scanning can initially be performed on the feature-rich regions to determine camera TCP and scene work object as a by-product of this regional scanning. When the robot scans the feature-poor regions, it can switch to robot-based odometry for stitching, because the camera TCP is now known. In the event that the feature-poor regions are scanned first, a buffer can be used to save the images and the corresponding robot position measurements until the camera TCP is found at later stage based on scanning feature-rich regions. After the camera TCP is found, stitching can resume on the buffer for the feature-poor regions.

Accordingly, aspects described herein can automate a calibration step otherwise performed to determine camera TCP and scene work object. No extraneous camera-to-robot calibration step is needed prior to scanning Additionally, aspects described herein can improve robot positioning accuracy by using multiple scene work objects and camera TCPs at different scene regions.

In addition to the above, actions that were previously performed strictly sequential on the entire scene may now be performed together. More specifically, instead of scanning, localizing, and then positioning in step-by-step fashion for the entire scene, the system can mix scanning, localizing, and positioning operations for different regions of the scene. In one example of such mixed operations, the robot system scans a region, searches for features in the current scan area (or current camera frame), localizes the features, and then moves to the features to perform operations. When work on the features in the current scan area is done, the robot moves to the next scan area and starts scanning, localizing and positioning for that area. Another example is that the robot scans the first scan area and localizes the features. It then moves to the second scan area and localizes the features. After that it performs the positioning operations for both scan areas. Yet another example, which is particularly suitable for the case where two or more robots are used, is that one robot performs scanning and localizing in one scan area, and the other robot, optionally contemporaneously, performs positioning in the other scan area in parallel. In this case, the first robot can carry the camera while the second robot can carry the gripper/tool. It can be understood that there are many different variations for the mixed operations. The above examples are not in any way limiting on the applicable use scenarios.

Figure 3:
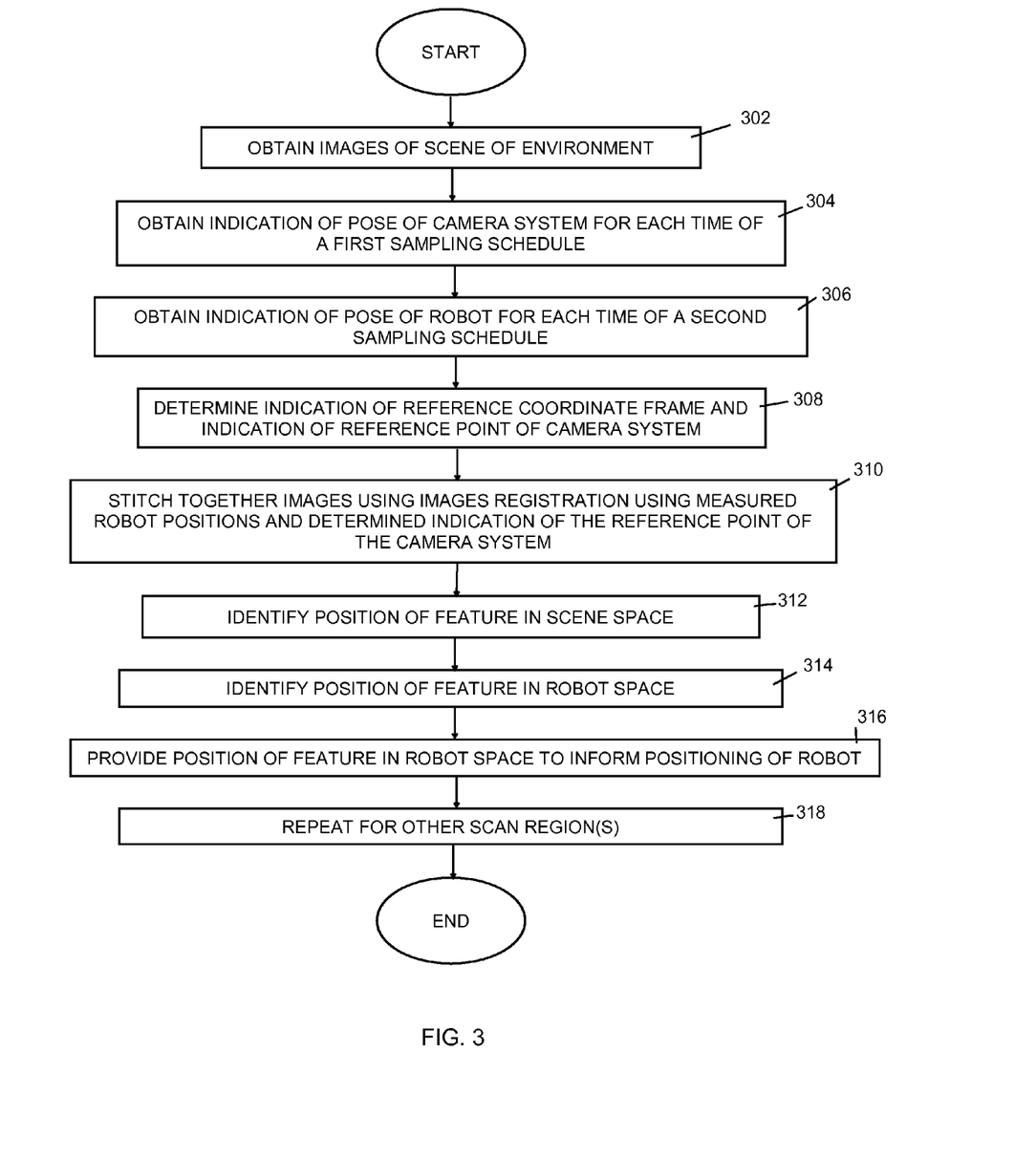
FIG. 3 depicts an example process to facilitate robot positioning, in accordance with aspects described herein.

FIG. 3 depicts an example process to facilitate robot positioning, in accordance with aspects described herein. The process begins by the robot obtaining images of a scene of an environment (302). Based on obtaining the images, indications of a pose of a camera system of a robot ($T_v(t)$) relative to a reference coordinate frame (W) are obtained (304) for each time of a plurality of times of a first sampling schedule. The obtaining of the indications of the pose of the camera system provides a plurality of indications of poses of the camera system (i.e. a $T_v(t)$ for each $t=t_1, \ldots, t_n$). An indication of the pose of the camera system may be based on a comparison of multiple three-dimensional images of a scene of an environment. The comparison may be performed absent knowledge of distance between features of the scene (i.e. on an unknown scene, rather than a test or pre-defined scene used for calibration, for example). As a specific example, the scene can include features of unknown characteristics.

The process continues by obtaining indications of a pose of the robot ($T_0(t')$) (306) for each time of a plurality of times of a second sampling schedule, the obtaining providing a plurality of indications of poses of the robot. Obtaining the indications of the pose of the robot provides a plurality of indications of poses of the robot (i.e. a $T_0(t')$ for each $t'=t_1', \ldots, t_n'$). The pose of the robot may be represented by pose of a mounting flange of the robot, by joint measurements of the robot, or any other desired representation. Using the plurality of indications of poses of the camera system and the plurality of indications of poses of the robot, an indication of the reference coordinate frame of the scene is determined as is an indication of a reference point of the camera system ($TCP_c$) relative to pose of the robot (308). By this determining, the determined indication of the reference point of the camera system serves as an automated calibration for the reference point of the camera system.

Using the plurality of indications of poses of the camera system and the plurality of indications of poses of the robot includes, in some examples, building a plurality of equations relating the plurality of poses of the camera system across the first sampling schedule to the plurality of poses of the robot across the second sampling schedule. The relating can be a function of the reference coordinate frame of the scene and the reference point of the camera system relative to the pose of robot (e.g. Eq. 6). Determining the indication of the reference coordinate frame of the scene and the indication of the reference point of the camera system in this case includes finding a solution for the plurality of equations to determine the indication of the reference coordinate frame of the scene and the indication of the reference point of the camera system.

In a specific example of building the plurality of equations, for each indication of a pose of the camera system, of the plurality of indications of poses of the camera system, a respective corresponding pose of the robot is identified and is based on one or more indications of poses of the robot of the obtained plurality of indications of poses of the robot. The first sampling schedule and second sampling schedule may differ by a time-offset (d). The identified respective corresponding pose of the robot for an indication of the pose of the camera system can therefore include an interpolated pose of the robot, interpolated based on the one or more indications of poses of the robot, where the interpolated pose of the robot is a pose of the robot at a time that differs from a time of obtaining one of the plurality of indications of poses of the robot by an amount of time equal to time-offset. In other words, and as an example, assume the time offset between a time t (of a $T_v(t)$) and a time t' (of a $T_0(t')$) is 3 ms (i.e. t=t'+d). The interpolated pose of the robot may be interpolated based on $T_0(t')$ obtained at time t' and possibly other obtained $T_0$ values. The interpolated pose of the robot will be for time t (to pair with $T_v(t)$), and therefore the interpolated pose of the robot is for a time (t), which differs from t' (the time of obtaining $T_0(t')$) by the time offset d.

The time-offset may be initially unknown. In this case, finding the solution for the plurality of equations can include either finding a solution for the time-offset with the finding the solution for the plurality of equations to determine the indication of the reference coordinate frame of the scene and the indication of the reference point of the camera system, or first finding a solution for the time-offset and then using that solution for the time-offset in finding the solution for the plurality of equations.

In any case, returning to FIG. 3, the process then stitches together images of at least part of the scene of the environment using an image registration method and/or using measured robot positions and the determined indication of the reference point of the camera system (310).

Based on identifying a position of a feature in a scene space of the scene imaged by the robot (312), the (i) determined indication of the reference coordinate frame (W) and (ii) a relation between the determined indication of the reference coordinate frame and the identified position of the feature in the scene space (Hw) is used to identify a position of the feature in robot space (Hr) (314). The identified position of the feature in robot space can then be provided to inform positioning of the robot (316), for instance to indicate a location to which the robot is to move to perform a desired task at, on, against, etc. the feature.

In some examples, aspects of FIG. 3 are performed for multiple scan regions, for instance to improve overall accuracy of robot positioning. Thus, the obtaining the plurality of indications of poses of the camera system (304) and the obtaining the plurality of indications of poses of the robot (306) may be associated with robot movement and imaging of a first scan region of the environment in which the robot operates. The determination (308) thus determines the indication of the reference coordinate frame and the indication of the reference point of the camera system for the first scan region. The process can repeat (318) this for other scan region(s). Thus, the process can loop (not shown in FIG. 3) back to repeat the (i) obtaining the plurality of indications of poses of the camera system and the (ii) obtaining the plurality of indications of poses of the robot in association with robot movement and imaging of at least one other scan region of the environment, then repeat the (iii) determining to determine an indication of a reference coordinate frame and an indication of a reference point of the camera system for the at least one other scan region. Once scanning is completed, the process ends.

The process of FIG. 3 may be performed by one or more computer systems, and some aspects may be performed by one set of computer system(s) while other aspects may be performed by another set of computer system(s), perhaps at a later time. For instance, one computer system may perform obtaining the images of the scene (302) and another computer system may be perform the obtaining (304), obtaining (306), and determining (308). The results of the determining may, in some examples, be used by the same computer system or passed to another computer system to perform the stitching (310). Further, one or more of the aforementioned computer systems, or yet other computer system(s) may perform the identifying (312, 314) and the providing (316).

Figure 4:
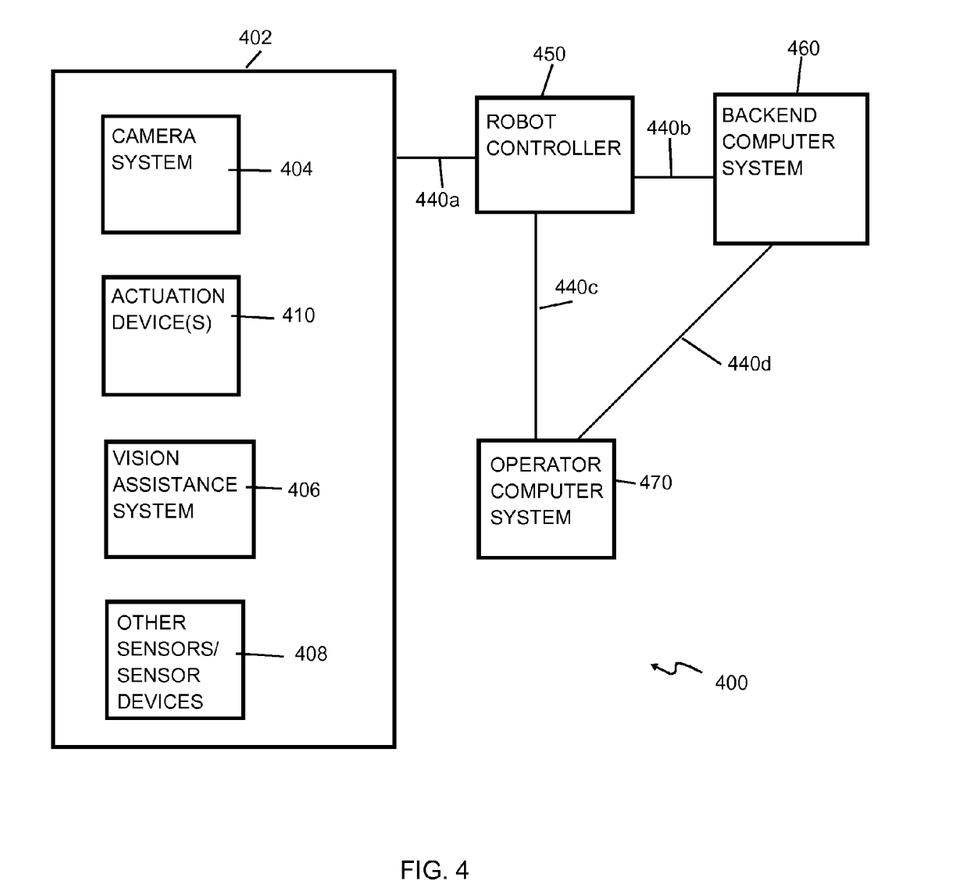
FIG. 4 depicts an example of a system to incorporate and use aspects described herein.

FIG. 4 depicts an example system to incorporate and use aspects described herein. System 400 includes a robot 402, robot controller 450, operator computer system 470, and backend computer system 460, all coupled via communication links 440a-440d. The physical locations of these components relative to one another can vary. For instance, they may be as close together as a few feet or as far apart as thousands of miles or more.

Communication links 440a-440d between the components may be realized by any of various wireless and/or wired technologies (e.g. fiber-optic/radio/cable on different types and layers of data protocols). In some embodiments, one or more such communication links includes existing infrastructure, such as existing Ethernet installations operating over one or more local or wide area network(s). A non-limiting list of additional communication link technologies includes wireless-LAN (WLAN), Bluetooth, ZigBee, near-field, or other wireless links, point-to-point radio systems or laser-optical systems, and satellite communication links, as examples.

Robot 402 may be any type of robot, such as an industrial robot offered by ABB Inc. of Auburn Hills, Mich., U.S.A., as an example. Example robots have several (usually 4, 5, 6 or 7) degrees of freedom enabling them to perform any of various tasks usually characterized by the movement and/or manipulation of objects. In this regard, a robot refers in its broadest sense to an assembly that has multiple degrees of freedom.

Robot functions are served by different, and typically application-specific, components, some of which are depicted as part of the example robot 402 of FIG. 4. It should be understood that robot 402 includes additional components omitted from FIG. 4 for convenience purposes, and further that a robot to incorporate/use aspects described herein need not necessarily include each of the components depicted in FIG. 4.

Camera system 404 provides imaging functions enabling the robot to 'see' physical objects in its environment. Camera system 404 may be realized by proprietary and/or application-specific imaging device(s) or commercial off-the-shelf (COTS) offerings providing 2-dimentional, 3-dimensional, and/or depth-sensing imaging capabilities. An example COTS product is the Kinect® motion controller offered by Microsoft Corporation. Vision assistance system 406 is another type of sensor system providing vision capabilities for the robot. It can also include imaging device(s) for imaging objects of the environment to assist in proximity or other spatial determinations. In some embodiments, the camera system 404 is mounted on the robot at or near a 'head' thereof providing a roughly $1^{st}$-person perspective of the robot's activities, while the vision assistance system 406 includes multiple cameras mounted around the robot 402 and imaging the robot 402 and its surroundings to provide a $3^{rd}$-person perspective of robot activities with respect to the surrounding objects.

Other sensor/sensor devices 408 are included to provide additional sensing capabilities. The particular additional sensors may be dependent on the types of tasks the robot will perform when in operation. A non-limiting list of additional sensors are microphones, position sensors, proximity sensors, and force/pressure sensors, as examples. Some sensor devices can include data processing capabilities. So-called smart sensors are usually, though not always, connected directly to robot controller 450 via communication link(s). Other types of sensors that lack on-board data processing capability to process captured data may provide data to a separate data processing device (such as robot controller 450, backend computer system 460, operator computer system 470, and/or another computer system, not pictured) to process the sensor device output.

Some sensors may be local to or remote from the robot 402 or robot controller 450. Remote sensor devices can provide input signals to the robot controller 450 that the robot controller 450 uses to control the robot 402 in performance of work described herein.

Some sensors that are mounted either on the robot 402 or at other locations can detect, or provide data that is processed to detect, obstacles that enter into or otherwise appear in the workspace of the robot 402. Sensor information including data about the detected obstacle can be processed and used by robot controller 450 for position and other geometric information. With respect to a smart sensor, a data processing capability thereof can fully or partially process sensor information and transfer to the robot controller 450 only the relevant data about the obstacle. In other types of sensors that lack data processing capability, the sensor information can be processed by another data processing device as described above and provided to robot controller 450.

The robot 402 can also include actuator(s) or other devices (collectively referred to as actuation devices 410) incorporated into, mounted to, or next to, the robot 402 to provide object manipulation capabilities for manipulating or moving objects. Example actuation devices 410 include grippers, claws, fixtures, suction devices, conveyors, twisting mechanisms, hose and/or wire feeder mechanisms, and specialized equipment like medical tools, welding guns, or spraying guns. Many actuation devices are more generally referred to as robot "end effectors".

Robot controller 450 provides motion data to robot 402 to control actions thereof. Motion data includes commands, as examples, sent to and received by component(s) of the robot that cause the components to drive robot actions, movement to other locations, and other activities. Accordingly, robot controller 450 may be a computer system having programs (i.e. instructions, program code) that execute to provide motion data to the robot 402 to control motion of the robot 402 to perform work. For instance, the robot 402 may hold a tool (not shown) used to perform work on a stationary or moving workpiece (also not shown), or may hold the workpiece to have work performed on it by an appropriate tool, as examples. As further examples, the robot 402 may include a feeder component to feed a hose or other object into holes or other spaces to accomplish a task such as planting explosive material. The feeder component may include a twisting mechanism configured to twist the hose or other object in order to more reliably reach desired locations.

Sensor information provided to the robot controller 450 directly or indirectly, such as via a data processing component to process sensor data, may be used to generate a safety zone in which the robot 402 may work. When obstacles enter into the workspace of the robot 402 based on repositioning the obstacle or the robot, a map can be built to inform the robot controller 450 of the safety zone. Additionally, information from sensor(s) or other components, such as components 404, 406 and/or 408, can be used by the robot controller to build a distance map and/or $\frac{2}{3}$-dimensional map. In some examples, raw sensor information is processed to build the map.

Robot controller 450 is in communication with operator computer system 470 used in controlling and/or observing robot behavior. The operator computer system 470 can show on a display thereof actual data about robot motion and attached processes, for example, camera images, acoustic feedback, and sensor values. Additionally, operator computer system 470 can act as a data processing device for sensor information, and can process data in both directions (i.e. data to/from the sensors). Operator computer system 470 may be implemented by any computer system desired, for instance an industrial personal computer or a programmable logic controller, as examples.

Some embodiments may feature at least partial control of the robot 402 by operator computer system 470. The operator computer system 470 can play a role in dictating, selecting, building, and/or providing commands or other signals to the robot 402 and/or robot controller 450 to cause the robot 402 to perform actions. In some examples, the operator computer system 470 has at least one teleoperation input device, such as joysticks or stylus-type devices that the operator can use to create continuous motion signals (position and/or speed signals) that can be provided to the robot 402 directly or via robot controller 450. Some teleoperation input devices can provide feedback to an operator based on, for example, input from sensors of the robot 402. Feedback can be any kind of feedback that can be sensed by an operator. An example is haptic or force feedback that causes a vibration in a joystick or a stylus.

The operator computer system can also include a safety enable device, such as a three-position switch, to provide the ability for the operator to enable or disable power to the robot 402 and/or other components of the system 400.

Backend computer system 460 can provide additional local or remote computing resources to support robot controller, operator computer system 470, and/or robot 402. In this regard, control of the robot 402 and/or other processes supporting robot tasks may be more demanding than can be handled by the front-end systems. A local or remote backend facility may be provided by backend computer system 460, and the front-end components can off-load work to the backend computer system 460. By way of specific example, processing of image data, especially 3-dimentional image data, may present a significant burden on the robot 402, sensors thereof, and/or robot controller 450. The image data may be provided in part or whole to backend computer system 460 for processing and results can be provided back to the robot controller 450 or another component for use in robot processes.

As mentioned prior, components of system 400 need not be located adjacent to each other. Backend computer system 460 may be located on-site or offsite, for instance as a remote cloud-based computing facility that offers a web-based data-processing solution.

One or more of the foregoing components of system 400 may be encompassed by, or included in, one or more other of the foregoing components. Similarly, functionality described above of a given component may be incorporated into a different component of the foregoing components. Backend compute resources provided by backend computer system 460, for example, may be included in the robot controller 450 or operator computer system 470, or vice versa. In some embodiments, functionality of robot controller 450 and/or operator computer system 460 is incorporated into backend computer system 460.

Processes described herein may be performed by one or more computer systems or other processing devices. An example computer system to incorporate and use aspects described herein is depicted and described with reference to FIG. 5. Computer system 500 includes one or more processors 502, memory 504, and one or more I/O devices 506, which may be coupled to each other by busses and other electrical hardware elements (not depicted). Processor(s) 502 include any appropriate hardware component(s) capable of implementing functions, for instance executing instruction(s) (sometimes alternatively referred to as code, firmware and/or software) retrieved from memory 504. Execution of the instructions causes the computer system 500 to perform processes, functions, or the like, such as those described herein supporting control and/or operation of a robot.

Figure 5:
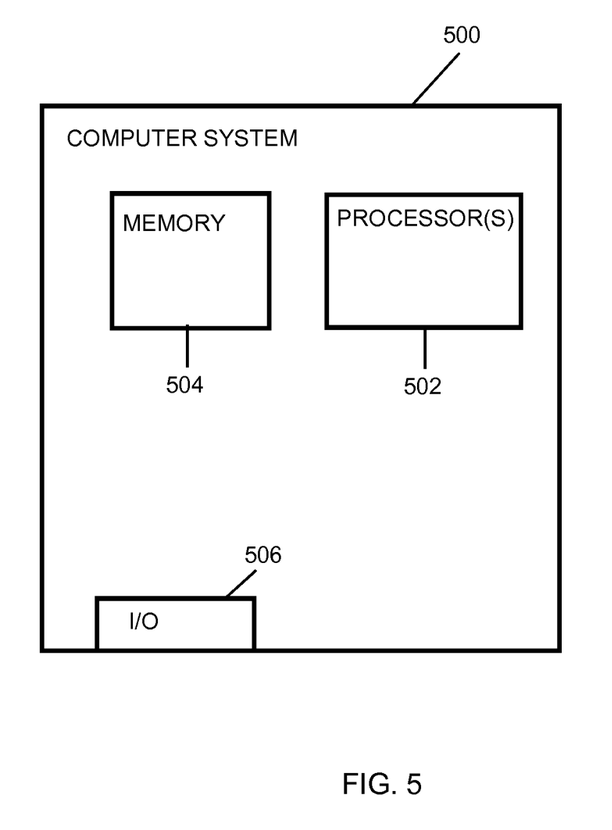
FIG. 5 depicts an example of a computer system to incorporate and use aspects described herein.

In some examples, aspects described herein are performed by a plurality of homogenous or heterogeneous computer systems coordinated to collectively perform processes, functions, or the like, such as those described herein supporting control and/or operation of a robot Memory 504 includes hardware components or other storage devices to store data such as programs of instructions for execution, and other data. The storage devices may be magnetic, optical, and/or electrical-based, as examples. Hard drives, field-programmable gate arrays (FPGAs), magnetic media, compact disks (CDs), digital versatile disks (DVDs), and flash memories are example storage devices. Accordingly, memory 504 may be volatile, non-volatile, or a combination of the two. As a specific example, memory 504 includes one or more hard drives and one or more random-access memory (RAM) devices for, respectively, non-volatile and volatile storage of data. Example programs stored by memory include an operating system and applications that run on the operating system, such as specialized applications to perform functions described herein.

I/O device(s) 506 include hardware and/or software components that support input and output of data to/from computer system 500. I/O device(s) 506 include physical components that attach physically or wirelessly to the computer system and/or integrate into the computer system, such as keyboards, mice, display devices, joysticks, camera devices, compact disks, thumb drives, printers, global positioning system (GPS) devices, gyroscopes, magnetometers, light sensors, proximity sensors, microphones, speakers, or accelerometers, as examples. I/O devices 506 also include, but are not limited to, I/O controllers and hardware and software supporting data communication with the aforementioned components, such as network, graphics, and/or audio controller(s). An example I/O device 506 is a network adapter for communication of data between computer system 500 and another component, such as another computer system, across communication links. Examples include Ethernet, cable, and/or fiber-based communications links passing data packets between computer system 500 and other systems across one or more networks, such as the Internet. Other example I/O devices 506 include universal serial bus (USB), peripheral component interconnect (PCI), and serial adapters/interfaces configured to couple to devices of their respective kind.

A non-limiting list of example computer systems includes: personal computers (PCs), laptops, workstations, servers, mainframes, network appliances, virtualization devices, computing terminals, personal digital assistants, cellular telephones and smartphones, wearable devices ("wearables"), tablet computers, and sensors such as cameras or camera systems.

Figure 6:
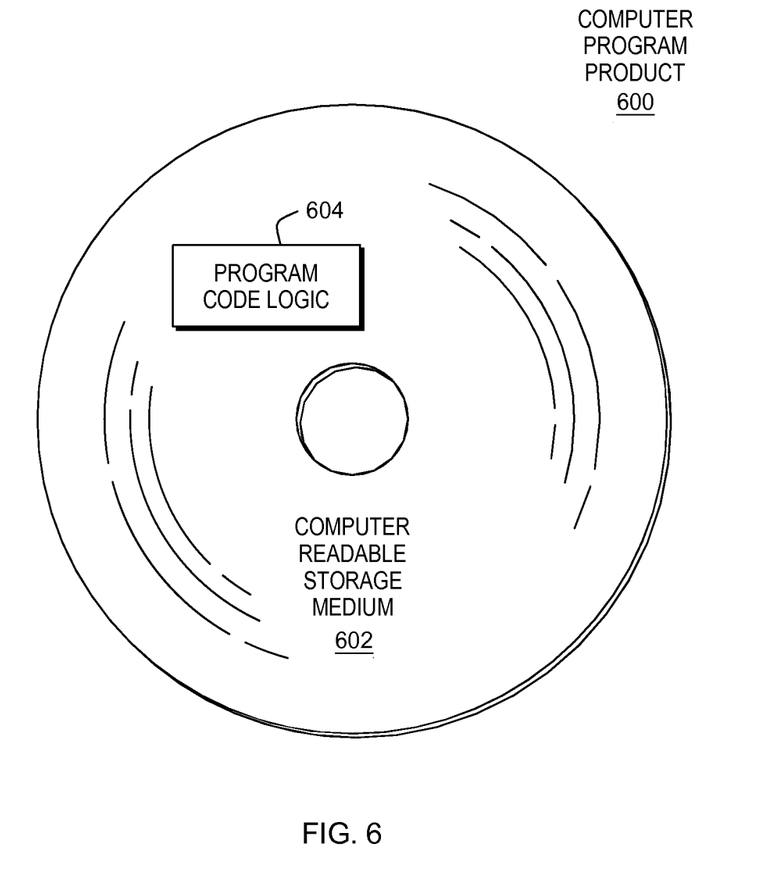
FIG. 6 depicts one embodiment of a computer program product.

Accordingly, aspects described herein may take the form of one or more systems, methods/processes, and/or a computer program products. A computer program product may be a computer-readable, tangible storage medium or device that stores instructions. In some embodiments, the computer program product is non-transitory computer readable storage media. Referring to FIG. 6, an example computer program product 600 is depicted that includes, for instance, one or more computer readable storage media 602 to store computer-readable program code means, logic and/or instructions 604 thereon to provide and facilitate one or more embodiments described herein.

A computer-readable storage medium can be, as examples, electronic, magnetic, electromagnetic, optical, and/or semi-conductor-based. Examples include but are not limited to: random access memory, read-only memory, computer disks, flash memory, and optical storage media like compact disks (CDs) or digital versatile disks (DVDs). As specifically used herein, computer-readable storage media does not per se consist of transitory signals, such as radio waves or other propagating signals.

Program code contained or stored in/on a computer readable storage medium can be obtained and executed by a computer system (computer, processing system, data processing system, etc. including a component thereof) and/or other device to cause the computer system, component thereof, and/or other device to behave/function in a particular manner. The program code can be transmitted using any appropriate medium, including (but not limited to) wireless, wireline, optical fiber, and/or radio-frequency. Program code for carrying out operations to perform, achieve, or facilitate aspects described herein may be written in one or more programming languages. In some embodiments, the programming language(s) include object-oriented and/or procedural programming languages such as C, C++, C#, Java, etc. Program code may execute entirely or partially on the computer system, a remote computer system, or a combination of partially on the computer system and partially on a remote computer system.

Program code can include program instructions obtained for execution by processor(s). Computer program instructions may be provided to processor(s) of, e.g., a computer system, to produce a machine, such that the program instructions, when executed by the processor(s), perform, achieve, or facilitate aspects described herein, such as actions, processes, or functions described in flowcharts and/or block diagrams described herein. Thus, each block, or combinations of blocks, of the flowchart illustrations and/or block diagrams depicted and described herein can be implemented, in some embodiments, by computer program instructions. Behaviors/functions specified or performed by one or more blocks may occur in a different order than depicted and/or described, or may occur simultaneous to, or partially/wholly concurrent with, one or more other blocks.

The terminology used herein is for the purpose of describing particular embodiments only and is not limiting of the invention. As used herein, the singular forms "a", "an" and "the" include the plural forms as well, unless the context clearly indicates otherwise. It will be further understood that the terms "comprise" (and any form of comprise, such as "comprises" and "comprising"), "have" (and any form of have, such as "has" and "having"), "include" (and any form of include, such as "includes" and "including"), and "contain" (and any form contain, such as "contains" and "containing") are open-ended linking verbs. As a result, a method or device that "comprises", "has", "includes" or "contains" one or more steps or elements possesses those one or more steps or elements, but is not limited to possessing only those one or more steps or elements. Likewise, a step of a method or an element of a device that "comprises", "has", "includes" or "contains" one or more features possesses those one or more features, but is not limited to possessing only those one or more features. Furthermore, a device or structure that is configured in a certain way is configured in at least that way, but may also be configured in ways that are not presented.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description, but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A method comprising:
   obtaining, for each time of a plurality of times of a first sampling schedule, a respective indication of a pose of a camera system of a robot relative to a reference coordinate frame, the respective indication of the pose of the camera system being based on a comparison of multiple three-dimensional images of a scene of an environment, the obtaining providing a plurality of indications of poses of the camera system;
   obtaining, for each time of a plurality of times of a second sampling schedule, a respective indication of a pose of the robot, the obtaining providing a plurality of indications of poses of the robot;
   determining, using the plurality of indications of poses of the camera system and the plurality of indications of poses of the robot, an indication of the reference coordinate frame and an indication of a reference point of the camera system relative to pose of the robot; and
   stitching together images of at least part of the scene of the environment using an image registration method or using measured robot positions and the determined indication of the reference point of the camera system.

2. The method of claim 1, wherein the using the plurality of indications of poses of the camera system and the plurality of indications of poses of the robot comprises building a plurality of equations relating the plurality of poses of the camera system across the first sampling schedule to the plurality of poses of the robot across the second sampling schedule, the relating being a function of the reference coordinate frame and the reference point of the camera system relative to the pose of robot, and wherein the determining comprises finding a solution for the plurality of equations to determine the indication of the reference coordinate frame and the indication of the reference point of the camera system.

3. The method of claim 2, wherein the building the plurality of equations comprises, for each indication of a pose of the camera system, of the plurality of indications of poses of the camera system, identifying a respective corresponding pose of the robot, the respective corresponding pose of the robot based on one or more indications of poses of the robot of the plurality of indications of poses of the robot.

4. The method of claim 3, wherein the first sampling schedule and second sampling schedule differ by a time-offset, and an identified respective corresponding pose of the robot for an indication of the pose of the camera system comprises an interpolated pose of the robot interpolated based on the one or more indications of poses of the robot being a pose of the robot at a time that differs from a time of obtaining one of the plurality of indications of poses of the robot by an amount of time equal to time-offset.

5. The method of claim 4, wherein the time-offset is initially unknown, and wherein the finding the solution for the plurality of equations comprises either finding a solution for the time-offset with the finding the solution for the plurality of equations to determine the indication of the reference coordinate frame and the indication of the reference point of the camera system, or first finding a solution for the time-offset and using that solution for the time-offset in finding the solution for the plurality of equations.

6. The method of claim 1, wherein pose of the robot is represented by pose of a mounting flange of the robot.

7. The method of claim 1, wherein pose of the robot is represented by joint measurements of the robot.

8. The method of claim 1, wherein the obtained plurality of indications of poses of the camera system and obtained plurality of indications of poses of the robot are obtained based on the robot obtaining images of a scene of an environment.

9. The method of claim 1, wherein the comparison is performed absent knowledge of distance between features of the scene.

10. The method of claim 1, wherein the scene comprises features of unknown characteristics.

11. The method of claim 1, wherein the determined indication of the reference point of the camera system serves as an automated calibration for the reference point of the camera system.

12. The method of claim 1, further comprising:
    identifying a position of a feature in a scene space of a scene imaged by the robot;
    using the determined indication of the reference coordinate frame and a relation between the determined indication of the reference coordinate frame and the identified position of the feature in the scene space to identify a position of the feature in robot space; and
    providing the identified position of the feature in robot space to inform positioning of the robot.

13. The method of claim 1, wherein the obtaining the plurality of indications of poses of the camera system and the obtaining the plurality of indications of poses of the robot is associated with robot movement and imaging of a first scan region of an environment in which the robot operates, and the determining determines the indication of the reference coordinate frame and the indication of the reference point of the camera system for the first scan region, and wherein the method further comprises:
   repeating the obtaining the plurality of indications of poses of the camera system and the obtaining the plurality of indications of poses of the robot in association with robot movement and imaging of at least one other scan region of the environment; and
   repeating the determining to determine an indication of a reference coordinate frame and an indication of a reference point of the camera system for the at least one other scan region.

14. A computer system comprising:
   a controller configured to execute program instructions to perform the acts of:
   obtaining, for each time of a plurality of times of a first sampling schedule, a respective indication of a pose of a camera system of a robot relative to a reference coordinate frame, the respective indication of the pose of the camera system being based on a comparison of multiple three-dimensional images of a scene of an environment, the obtaining providing a plurality of indications of poses of the camera system;
   obtaining, for each time of a plurality of times of a second sampling schedule, a respective indication of a pose of the robot, the obtaining providing a plurality of indications of poses of the robot;
   determining, using the plurality of indications of poses of the camera system and the plurality of indications of poses of the robot, an indication of the reference coordinate frame and an indication of a reference point of the camera system relative to pose of the robot; and
   stitching together images of at least part of the scene of the environment using an image registration method or using measured robot positions and the determined indication of the reference point of the camera system.

15. The computer system of claim 14, wherein the using the plurality of indications of poses of the camera system and the plurality of indications of poses of the robot comprises building a plurality of equations relating the plurality of poses of the camera system across the first sampling schedule to the plurality of poses of the robot across the second sampling schedule, the relating being a function of the reference coordinate frame and the reference point of the camera system relative to the pose of robot, and wherein the determining comprises finding a solution for the plurality of equations to determine the indication of the reference coordinate frame and the indication of the reference point of the camera system.

16. The computer system of claim 14, wherein the scene comprises features of unknown characteristics.

17. The computer system of claim 14, wherein the controller is configured to execute the program instructions to perform the acts of:
   identifying a position of a feature in a scene space of a scene imaged by the robot;
   using the determined indication of the reference coordinate frame and a relation between the determined indication of the reference coordinate frame and the identified position of the feature in the scene space to identify a position of the feature in robot space; and
   providing the identified position of the feature in robot space to inform positioning of the robot.

18. A computer program product comprising:
   a computer readable storage medium readable by a processor and storing instructions for execution by the processor for performing a method comprising:
   obtaining, for each time of a plurality of times of a first sampling schedule, a respective indication of a pose of a camera system of a robot relative to a reference coordinate frame, the respective indication of the pose of the camera system being based on a comparison of multiple three-dimensional images of a scene of an environment, the obtaining providing a plurality of indications of poses of the camera system;
   obtaining, for each time of a plurality of times of a second sampling schedule, a respective indication of a pose of the robot, the obtaining providing a plurality of indications of poses of the robot;
   determining, using the plurality of indications of poses of the camera system and the plurality of indications of poses of the robot, an indication of the reference coordinate frame and an indication of a reference point of the camera system relative to pose of the robot; and
   stitching together images of at least part of the scene of the environment using an image registration method or using measured robot positions and the determined indication of the reference point of the camera system.

19. The computer program product of claim 18, wherein the using the plurality of indications of poses of the camera system and the plurality of indications of poses of the robot comprises building a plurality of equations relating the plurality of poses of the camera system across the first sampling schedule to the plurality of poses of the robot across the second sampling schedule, the relating being a function of the reference coordinate frame and the reference point of the camera system relative to the pose of robot, and wherein the determining comprises finding a solution for the plurality of equations to determine the indication of the reference coordinate frame and the indication of the reference point of the camera system.

20. The computer program product of claim 18, wherein the scene comprises features of unknown characteristics.

21. A method, comprising:
   obtaining a plurality of three-dimensional images of a scene of an environment;
   comparing the plurality of three-dimensional images of the scene;
   obtaining, for each time of a plurality of times of a first sampling schedule, a respective indication of a pose of a camera system of a robot relative to a reference coordinate frame, the respective indication of the pose of the camera system being based on the comparing of the plurality of three-dimensional images, the obtaining providing a plurality of indications of poses of the camera system;
   obtaining, for each time of a plurality of times of a second sampling schedule, a respective indication of a pose of the robot, the obtaining providing a plurality of indications of poses of the robot;
   determining, using the plurality of indications of poses of the camera system and the plurality of indications of poses of the robot, an indication of the reference coordinate frame and an indication of a reference point of the camera system relative to pose of the robot;
   using an image registration method and also using measured robot positions and the determined indication of the reference point of the camera system to stitch together images of at least part of the scene of the environment;
identifying a position of a feature in a scene space of the scene;
determining a relation between the determined indication of the reference coordinate frame and the identified position of the feature in the scene space;
identifying the position of the feature in a robot space based on the identified position of a feature in a scene space of the scene, the determined indication of the reference coordinate frame, and the determined relation between the determined indication of the reference coordinate frame and the identified position of the feature in the scene space;
informing the position of the robot based on the identified position of the feature in the robot space; and
operating the robot based on the informed position of the robot.

* * * * *